INVENTORS.
LEON D. KELLER
ERIC L. SANDSTROM
BY Theodore M. Jablon
ATTORNEY.

INVENTORS.
LEON D. KELLER
ERIC L. SANDSTROM

INVENTORS.
LEON D. KELLER
ERIC L. SANDSTROM
BY Theodore M. Jablon
ATTORNEY.

INVENTORS.
LEON D. KELLER
ERIC L. SANDSTROM
BY Theodore M. Jablon
ATTORNEY.

INVENTORS.
LEON D. KELLER
ERIC L. SANDSTROM
BY Theodore M. Jablon
ATTORNEY.

United States Patent Office 3,452,874
Patented July 1, 1969

3,452,874
TRUNNION VALVE FOR CONTINUOUS ROTARY FILTERS
Leon D. Keller, Virginia, Minn., and Eric L. Sandstrom, Bethel, Conn., assignors to Dorr-Oliver Incorporated, Stamford, Conn., a corporation of Delaware
Filed Nov. 2, 1967, Ser. No. 680,138
Int. Cl. B01d 33/08, 33/06
U.S. Cl. 210—331                                    19 Claims

ABSTRACT OF THE DISCLOSURE

In a continuous rotary filter having a horizontal axis of rotation, an improved trunnion valve for controlling the filtration cycle, featuring bridge plate means comprising a first blocking part determining the position at which the vacuum is cut off from the travelling filter surface, and a second blocking part determining the position at which the vacuum commences, said blocking parts being adjustable relative to each other about the axis, and wherein the bridge means itself may also be rotationally adjustable about said axis.

---

This invention relates to continuous rotary filters having an assembly of filter chambers mounted to rotate about a horizontal axis on a pulp containing vat.

This class of filters may include disc type filters, drum filters having the filter media attached to the drum, as well as belt-type drum filters, all of which have a trunnion at the end of the rotatable assembly, provided with internal ducts spaced about the axis, and leading from the vertical end face of the trunnion to the respective filter chambers.

More in particular, this invention relates to improvements in the so-called trunnion valve containing the so-called bridges or bridge blocks which cooperate with the end face of the trunnion and the ducts in controlling the phases or zones of the filtration cycle of the machine.

The operating zones in the filtration cycle may require certain adjustments of the bridge blocks, to be effected, for example, during start-up or to meet changing conditions in the filter operation.

One object of this invention therefore is to provide simple, practical, and compact means for independently adjusting the position as well as the effective arcuate extent of the respective zones. More particularly, these adjusting means should be operable in a manner which avoids the previous cumbersome necessity of dismounting the trunnion valve to gain access to the bridge blocks so that they might be re-positioned or exchanged.

In its simplest form the operating cycle itself may comprise a vacuum cake forming or pick-up zone effective during submergence of the filter chambers in the pulp; a vacuum cake drying zone subsequent to the cake forming zone, effective after emergence of the filter chambers from the pulp; and a neutral zone following the drying zone to allow filter cake to be discharged before re-immersion of the filter chambers in the pulp, and extending down to the starting point of the submerged cake pick-up zone.

In this instance, a single source of vacuum may serve both the cake pick-up and the drying zone. But if a wash liquid be applied to the filter cake after emergence, then a second neutral zone may be interposed between the cake forming zone and a combined cake washing and drying zone, in order that a strong filtrate liquor fraction and a weak spent wash liquor fraction be collected in separate vacuum receivers. A corresponding additional bridge block with corresponding additional partitioning means in the manifold part of the trunnion valve will provide for such a fractionation.

Furthermore, where indicated, filter cake discharge may be assisted by the inclusion in the filtration cycle of a blow-back zone interposed between two neutral zones functionally separating the blow-back effect from the preceding drying zone and from the subsequent cake forming or pick-up zone.

Normally, two critical points in the filtration cycle requiring adjustment independent of each other are the starting point of the cake discharge zone and the starting point of the cake pick-up zone.

According to the invention, the problem of providing for such independent adjustment is solved by the provision of a pair of bridge plates coaxial with one another and with the trunnion axis, and in face-to-face contact with one another.

The two bridge plates are so constructed and arranged with respect to one another that rotational movement of one plate will independently adjust the starting point of the cake discharge zone, whereas rotational adjustment of the other plate will independently adjust the starting point of the cake pick-up zone.

First fastening means are provided for holding the bridge plates in adjusted position against the inner transverse end face of the hollow member or manifold part of the stationary trunnion valve. A second fastening means is for holding this stationary assembly unit cooperative against the end face of the rotating trunnion. Accordingly, to adjust the respective bridge plates individually about the axis requires no more than somewhat loosening the fastening means, then angularly adjusting the bridge plates to the extent required for properly locating the respective operating zones, and then again tightening the fastening means. The adjustment may comprise moving the co-acting bridge plates individually relative to each other about the trunnion axis, or moving them together as a unit.

In a practical and advantageous embodiment of this invention the arcuate bridge blocks of the respective plates have inter-engaging co-acting relationship with one another, such that rotative movement of the bridge plates relative to each other will increase or decrease the effective arcuate length of the combined bridge blocks, and accordingly vary the extent or position of respective operating zones in the filtration cycle.

The bridge plates may be centered at their peripheries relative to one another, providing the advantage of a maximum of open vacuum throughflow area; or the bridge plates may be centered about a pivot provided centrally upon the manifold portion of the trunnion valve.

Other features and advantages will hereinafter appear.

Figures 1, 2, 3:
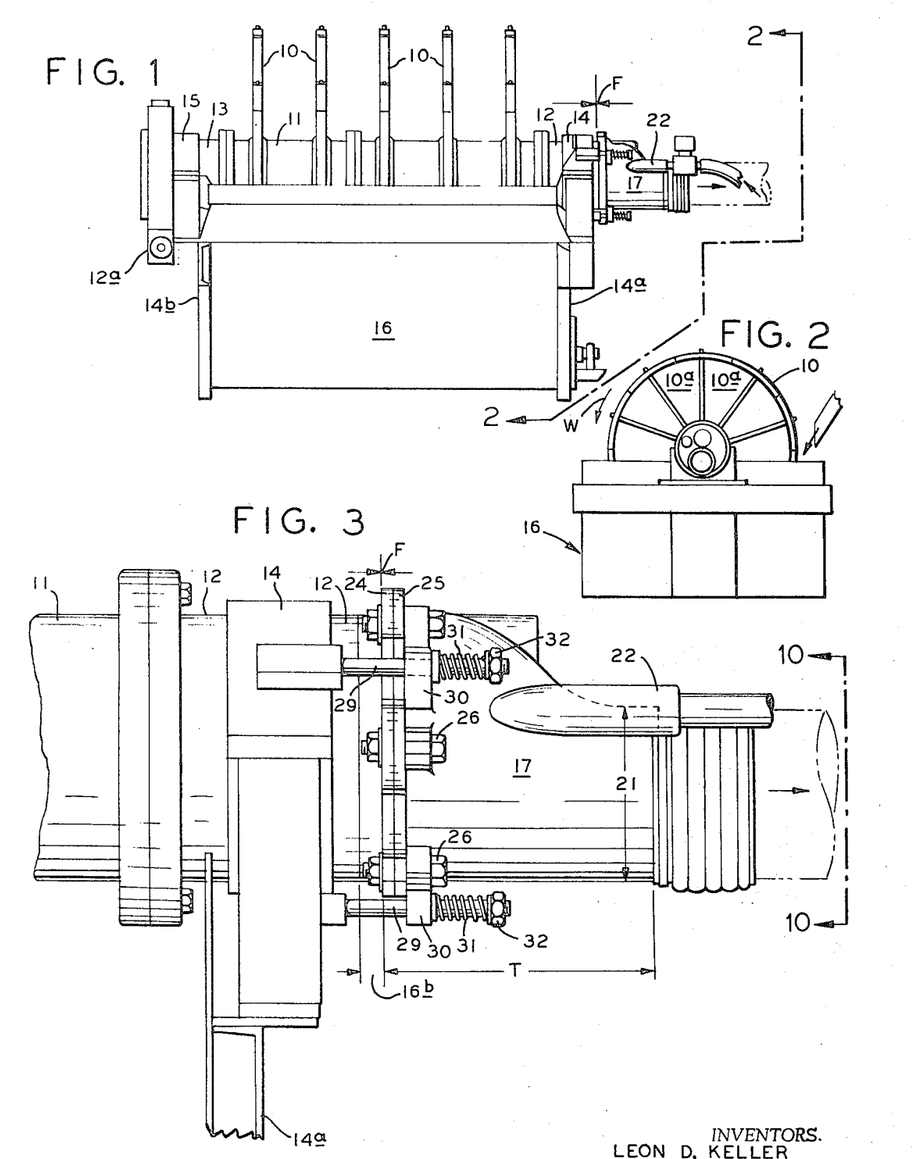
FIG. 1 is a side view of a continuous rotary disc filter as an example, showing the valve embodying the invention.
FIG. 2 is a view upon the valve end of the filter, taken on line 2—2 in FIG. 1.
FIG. 3 is an enlarged side view of the valve taken from FIG. 1, showing the two adjustable bridge plates of the invention.

The invention, by way of example, is herein shown embodied in a disc filter generally illustrated in FIGURES 1 and 2. Accordingly, an assembly of filter chambers rotatable about a horizontal axis comprises a series of filter discs 10 mounted upon a filter shaft 11, in horizontally spaced relationship to one another. The trunnion ends 12 and 13 of the shaft rotate in bearing structures 14 and 15 mounted upon respective end walls 14a and 15a of a vat 16, so that the lower portions of the discs will be immersed into a body of pulp in the vat.

Each filter disc in turn constitutes an assembly of sector-shaped filter chambers 10a (see FIG. 2) having filter media mounted thereon at both sides. Each sector of each disc registers horizontally with corresponding sectors of all the other discs, so that there are as many horizontal rows of sectors as there are sectors in each disc. Rotation of this assembly about the shaft axis in the direction of arrow W will cause the filter chambers of each disc to pass sequentially through the pulp. Filter cake collected on the filter discs may be discharged at the descending side thereof in a conventional manner here not shown.

Figure 5:
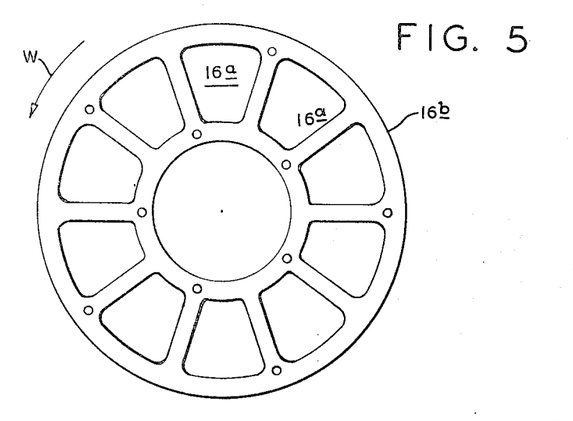
FIG. 5 is a cross-sectional view taken in FIG. 4, showing the arrangement of the ducts in the filter shaft.

Within the filter shaft there are provided horizontal ducts 16a (see FIG. 5) parallel to and equally spaced around the axis. Each of these ducts inwardly communicates with a respective row of filter sectors or chambers, and outwardly terminates in the transverse or vertical end face of the trunnion end 12 of the shaft. This end face of the trunnion is represented by a conventional wear plate 16b the openings of which register with the ducts. The rotating trunnion end face cooperates in face-to-face sliding contact with a stationary so-called trunnion valve T, the vertical plane of working contact or interface being indicated at F. The opposite end of the filter shaft is closed. Drive means 12a are indicated at this end for rotating the shaft.

Trunnion valve T controls the filtration cycle incident to the rotation of the filter shaft, so that vacuum and, if need be, back-blow air pressure may be applied to the filter chambers 10a within respective zones or phases of the filtration cycle, timed relative to a required period of submergence of the filter chambers in the cake forming phase, and also after emergence at the ascending side of the discs during the cake drying phase, while back-blow acts to detach the cake in the discharge zone at the descending side of the discs.

The improved trunnion valve of this invention is shown in FIG. 3, featuring improvements in the bridging arrangement controlling the filtration cycle. FIG. 3 and FIGURES 4 to 16 derived therefrom will serve in the following description of the invention in more detail.

Figure 4:
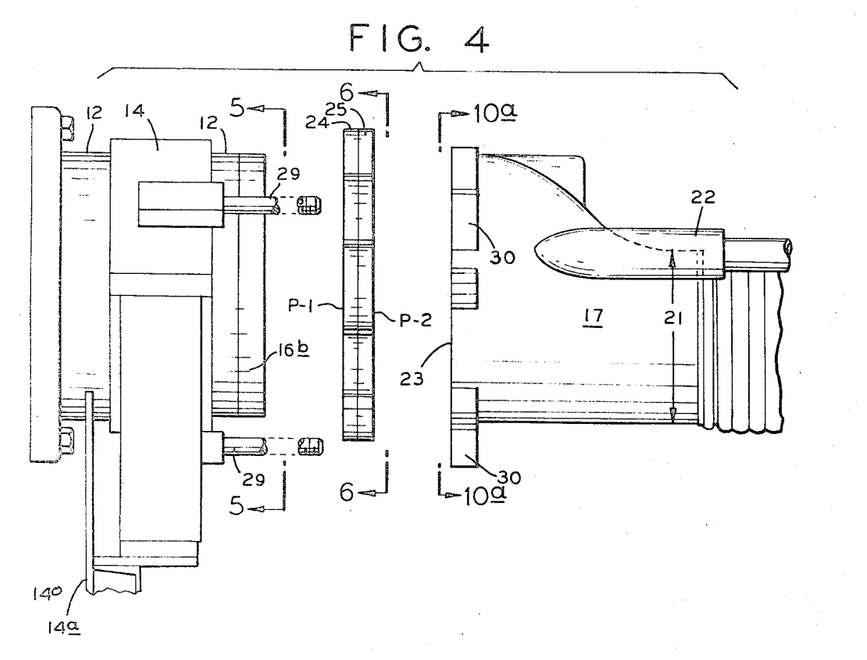
FIG. 4 is an exploded view of the valve shown in FIG. 3, showing the bridge plate assembly separated from the adjoining parts.

The trunnion valve according to FIGS. 3 and 4 comprises a hollow open-end manifold member 17 (see also FIGS. 10 and 10a) provided internally with a partition 18 which separates a vacuum supply chamber 19 from a back-blow air supply chamber 20, the vacuum being supplied through a wide neck 21 and the back-blow air through a narrow neck 22.

The vertical inner end face 23 of the manifold member (see FIG. 4) has attached thereto an improved novel bridge arrangement adjustable for independently controlling the location of certain operating zones or phases in the filtration cycle without necessitating the dismounting of the trunnion valve. According to the invention, this bridge arrangement comprises an assembly of two bridge plates 24 and 25. This plate assembly (see also FIG. 6) in turn is held in place against the end face of the manifold member concentric therewith and with the filter axis, by means of a first set of fastening means or bolts 26 extending through arcuate slots 26a formed concentric with the axis in radial outward projections 27 of the plates, separated from one another by recesses 28.

A second set of fastening means or horizontal bolts 29 extending rigidly from the trunnion bearing structure 14, holds the trunnion valve including the bridge plate assembly cooperative and coaxial with the associated trunnion end of the shaft. The bolts 29 extend through lugs 30 on the manifold member, with compression springs 31 surrounding the free ends of the bolts and confined by nuts 32, to maintain the working contact or interface F between the stationary trunnion valve and the rotary shaft.

The bridge plates 24 and 25 are so constructed and arranged that adjustment thereof relative to one another about the axis will permit individual independent adjustment of two critical points in the filtration cycle, namely the starting point of the cake forming or pick-up zone and the starting point of the cake discharge zone. The function and manipulation of this bridge arrangement according to the invention will appear from the following detailed description.

The axially inwardly located bridge plate 24 comprises a ring member 33 having parallel vertical side faces 34 and 35 defining between them the plate thickness $t$. This ring member has an inner cylindrical face of the radius R–1, from which rigidly extends radially inwardly (see FIG. 8) a bridge block 36 of substantially trunco-conical or sector-shaped configuration defined by radial faces 37 and 38, and by curved end faces respectively of the larger radius R–1 and a smaller radius R–2. This bridge block has vertical parallel side faces 39 and 40 co-planar with respective side faces 34 and 35 of the ring member.

Figures 6, 6A, 8A, 8B:
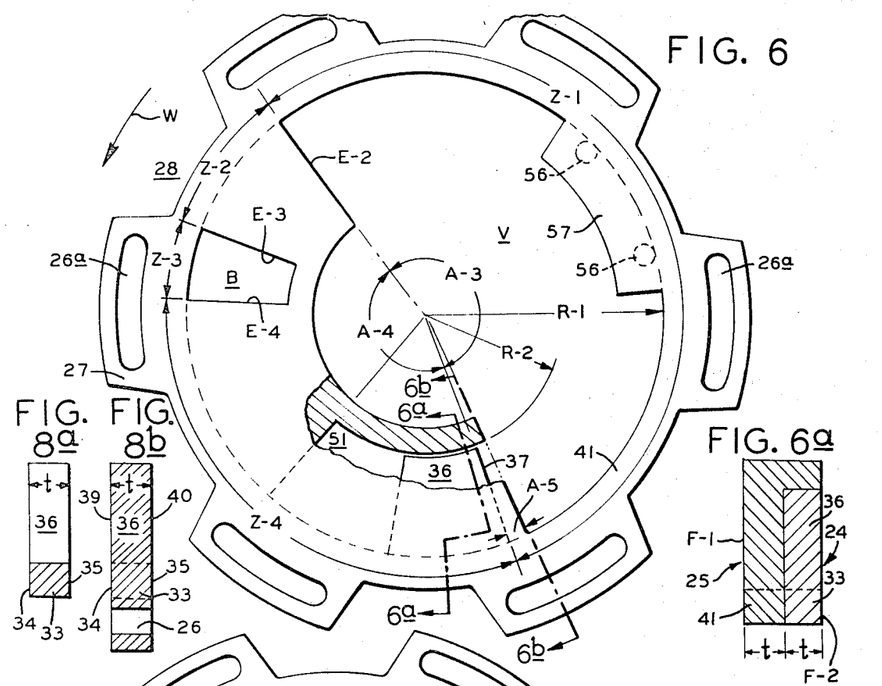
FIG. 6 is a cross-sectional view taken in FIG. 4, showing one side of the bridge plate assembly, with a portion broken away.
FIG. 6a is a sectional view taken on line 6a—6a in FIG. 6.
FIG. 8a is a sectional view taken on line 8a—8a in FIG. 8.
FIG. 8b is a sectional view taken on line 8b—8b in FIG. 8.
Figures 6B, 8:
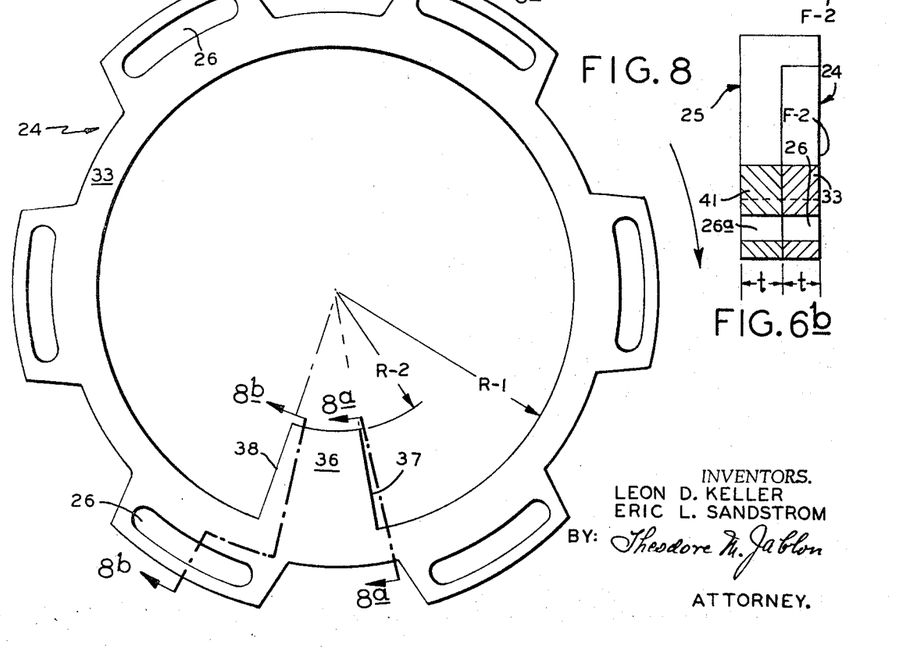
FIG. 6b is a sectional view taken on line 6b—6b in FIG. 6.
FIG. 8 is a cross-sectional view of bridge plate assembly taken on line 8—8 in FIG. 7, providing a face view of the inwardly located bridge plate.
Figures 7, 9, 9A, 9B, 9C, 9D, 10, 10A:
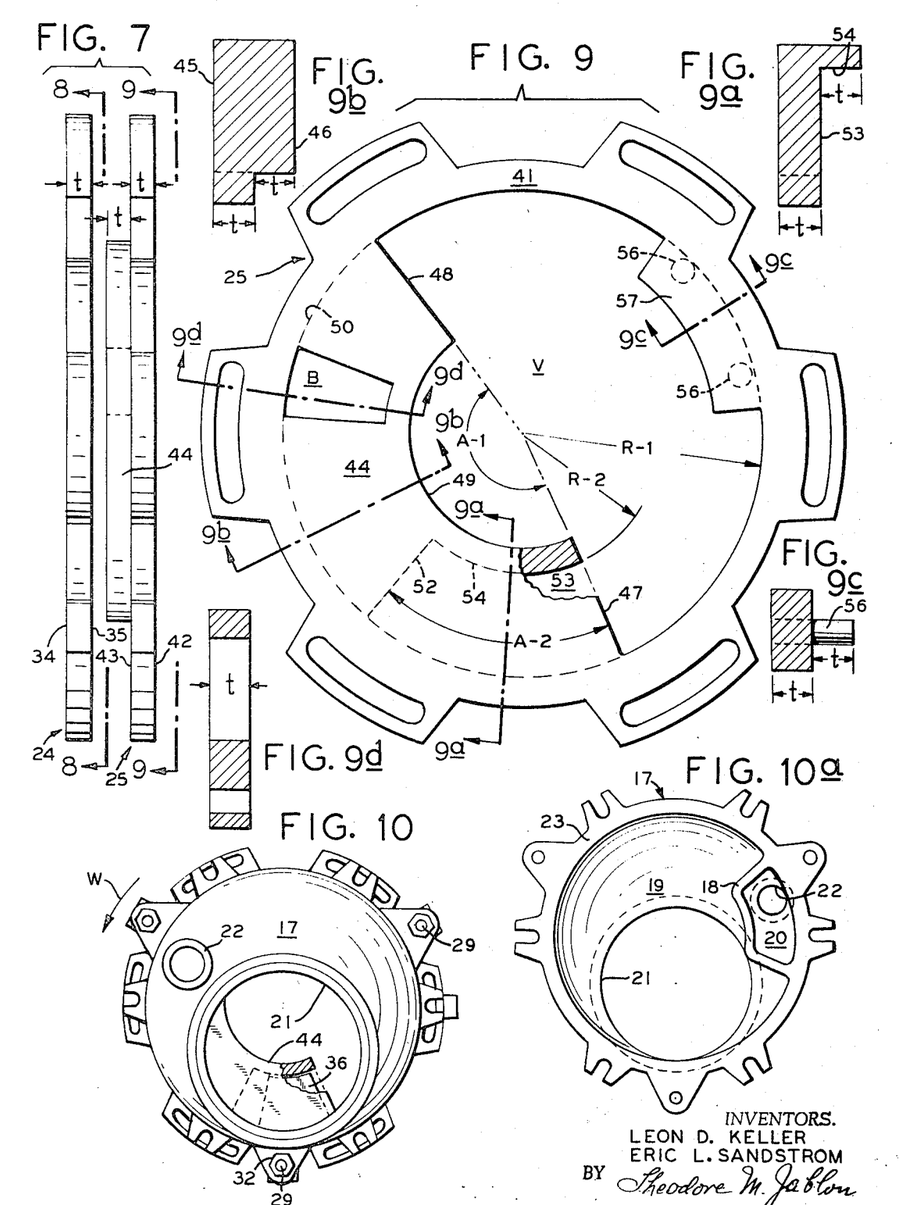
FIG. 7 is an enlarged view of the bridge plate assembly of FIG. 4, showing the two bridge plates drawn apart.
FIG. 9 is a cross-sectional view taken on line 9—9 in FIG. 7, providing a face view of the outwardly located bridge plate.
FIG. 9a is a sectional view taken on line 9a—9a in FIG. 9.
FIG. 9b is a sectional view taken on line 9b—9b in FIG. 9.
FIG. 9c is a sectional view taken on line 9c—9c in FIG. 9.
FIG. 9d is a sectional view taken on line 9d—9d in FIG. 9.
FIG. 10 is an outer end view of the manifold member of the valve, taken on line 10—10 in FIG. 4.
FIG. 10a is a cross-sectional view taken on line 10a—10a in FIG. 4, showing the inner end of the manifold member of the valve.
Figure 11:
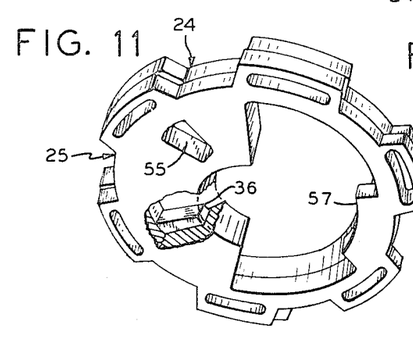
FIG. 11 is a perspective view of the bridge plate assembly, taken in the direction of arrow A–1 in FIG. 4.
Figure 12:
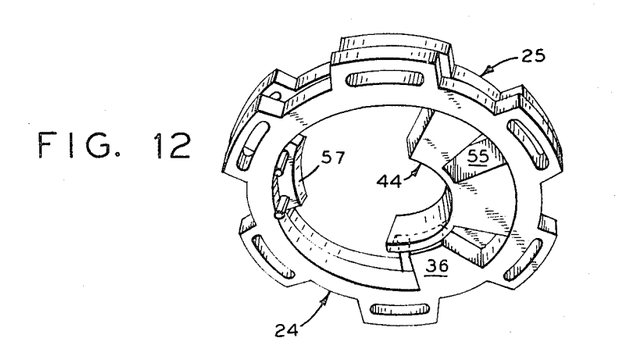
FIG. 12 is a perspective view of the bridge plate assembly, taken in the direction of arrow A–2 in FIG. 4.
Figure 13:
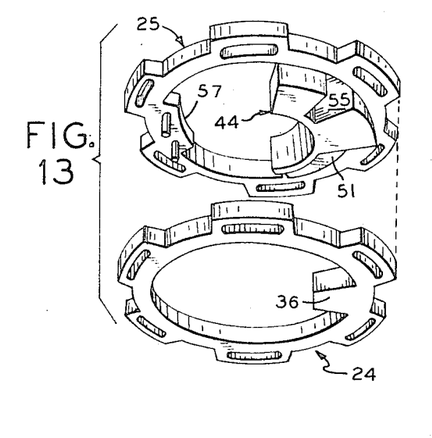
FIG. 13 is an exploded view of the bridge plate assembly shown in FIG. 12.
Figure 14:
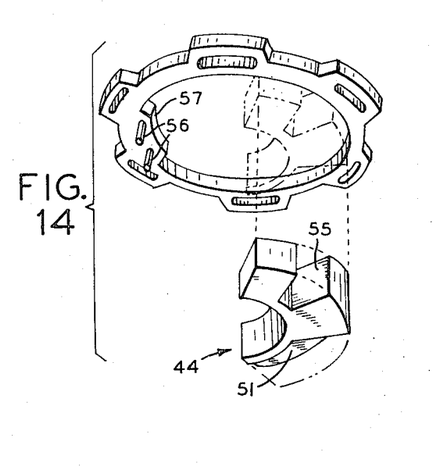
FIG. 14 shows the outer bridge plate with the bridge block separated from the ring.
Figures 14A, 14C, 14D:
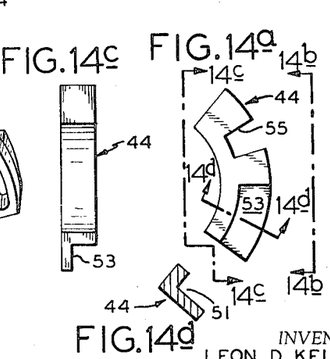
FIGS. 14a, 14b, 14c, 14d show detail view of the separated block of FIG. 14.
Figure 14B:
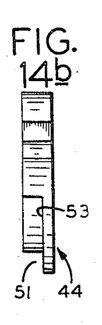

The axially outwardly located or outer companion bridge plate 25 comprises a ring member 41 (see FIGS. 9 and 13, and 14) which has the same configuration in the vertical plane as ring member 33, and may have the same thickness $t$ between vertical side faces 42 and 43 (see FIG. 7). Conforming to the inner cylindrical contour of radius R–1 of the ring member 41 and fixed thereto is a bridge block 44 of arcuate shape. This bridge block is of a special configuration interengaging the other bridge block 36 in a manner best shown in detail FIGURES 6, 6a, 6b and in perspective FIGURES 11 to 14. With the bridge blocks so interengaged the bridge plates are movable relative to each other about the filter axis in a manner whereby the aforementioned independent zone adjustments in the filtration cycle are attainable, and furthermore to be described.

For the purposes of this invention, the bridge block 44 (FIGS. 9, 9a, 9b, 14) is basically in the shape of an arcuate block defined by parallel vertical faces 45 and 46, radial end faces 47 and 48, and arcuate or semi-cylindrical faces 49 and 50 concentric with the filter axis. The arcuate extent of the block is indicated by the angle A–1. The vertical side face 45 of the block is co-planar with the vertical side face 42 of ring member 41, so that when the bridge plates are assembled, the block 44 having double the thickness $t$ projects and fits concentrically into the companion ring member 33. The plate assembly then presents parallel vertical faces F–1 and F–2 (see FIGS. 6a and 6b) in contact with the vertical end faces of the manifold member and of the trunnion respectively.

The lower end portion of block 44 is formed with an arcuate recess 51 well illustrated in FIGS. 6, 6a, 6b, 9a, 9b. This recess has an arcuate extent indicated by angle A–2, and is further defined by a radial face 52, a vertical planar face 53, an arcuate face 54 of radius R–2, and by a depth equal to the thickness $t$ of one of the above described ring members. An open end of the recess terminates in the plane of the radial end face 47.

The block 44 in this embodiment is furthermore formed with a radial recess 55 (see FIGS. 13 and 14) which in the plate assembly of FIG. 6 provides a back-blow passage area B to be effective in the cake discharge zone when the filter shaft is rotated counterclock-wise in the direction of arrow W. This back-blow passage communicates with chamber 20, while a much larger throughflow passage area V in the plate assembly communicates with chamber 19 of manifold member 17. It will be understood that the area of chamber 20 is large enough relative to the throughflow passage area B to allow the bridge plate to be moved about the filter axis within a desired range without losing communication with chamber 20 of the manifold. Similarly there is always communication between the large throughflow passage area V and the associated chamber 19 of the manifold within the range of plate adjustments.

Figure 15:
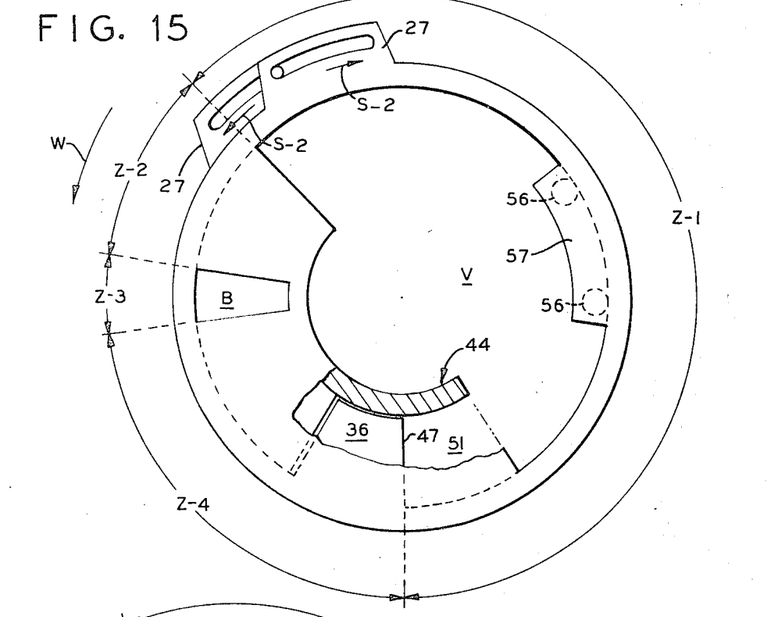
FIGS. 15, 16 show the bridge plate assembly with the bridge plates in different adjusted portions, along with the respective filter cycle diagrams.
Figure 16:
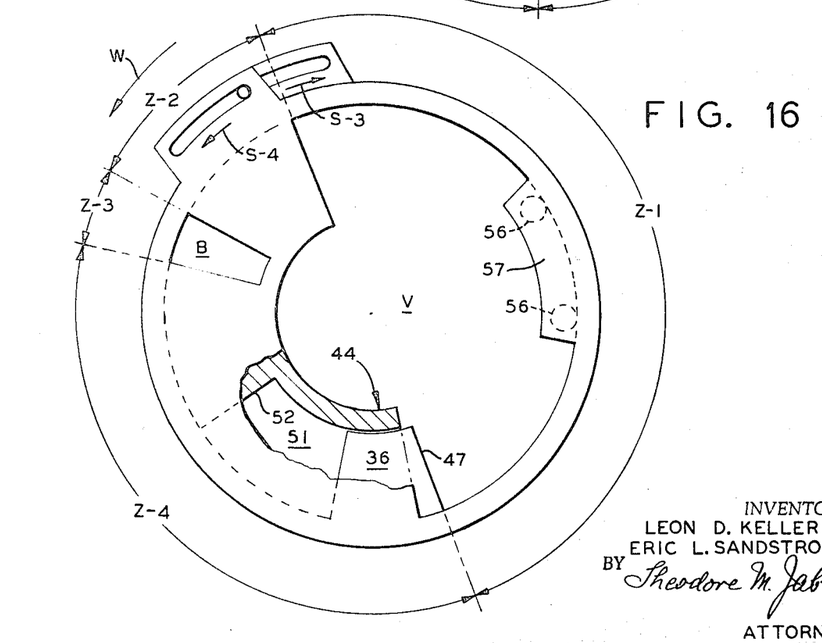

In the assembly, the bridge block 36 conforms closely to the profile of recess 51 (see FIGS. 6, 6a, 6b) so that moving the bridge plates about the axis relative to one another will shift the radial face 37 of block 36 into or out of recess 51, thereby extending or contracting the effective arc A–3 of the vacuum zone Z–1 (see FIGS. 6, 15, 16) while correspondingly changing the complementary arc A–4 comprising a first neutral or blank-off zone Z–2, a back-blow zone Z–3, and a second neutral or blank-off zone Z–4 (see FIGS. 6, 15, 16).

Independent or individual adjustments of the two critical points of the filtration cycle are thus made possible after slightly loosening the fastening bolts 26, by first moving bridge plate 25 so that the radial face 48 of block 44 assumes the desired critical position in the filtration cycle, determining the start of the neutral or cake discharge zone. Thereafter, while bridge plate 25 is held steady, the companion bridge plate 24 may be moved so that the radial face 37 of block 36 assumes the desired critical position in the filtration cycle, determining the start of the neutral or cake discharge zone.

FIGS. 15 and 16 represent extreme positions of the bridge plates relative to one another, while FIG. 6 presents an intermediate position. Accordingly, in FIG. 6 the bridge block 36 appears retracted into recess 51 of the companion bridge block 44 only to a slight extent as indicated by the pointed angle A–5, with the outward slotted projections 27 of both bridge plates shown in registry with one another.

In FIG. 15 the bridge plates have been rotated relative to one another in the direction of oppositely directed arrows S–1 and S–2 respectively, so that bridge block 36 is retracted far into the recess 51, with the slotted projections 27 shown in extreme non-registering position as limited by the fastening bolts 26.

In FIG. 16 the bridge plates have been rotated relative to one another in directions opposite to those in FIG. 15, as indicated by respective oppositely directed arrows S–3 and S–4, so that bridge block 36 now projects substantially beyond the end of recess 51, with the outward slotted projections 27 of the bridge plates in extreme non-registering positions as limited by the fastening bolts 26.

In this embodiment providing the large unobstructed vacuum throughflow area V in the plate assembly, the centering of the plates relative to each other is effected partly by the arcuate bridge block 44 of plate 25 conforming to and engaging the inner cylindrical curvature of the companion bridge plate 24, and additionally by the provision of a pair of locating pins 56 provided on a projection 57 extending inwardly from said cylindrical curvature, and having vertical side faces co-planar with those of bridge plate 24.

From the foregoing it will be understood that in the operation of the filtration cycle, each of the horizontal ducts in the shaft and the connected row of filter sectors 10a will be subjected sequentially in the direction of arrow W to the effects of the vacuum zone Z–1, the first neutral or blank-off zone Z–2, the back-blow zone Z–3, and the second neutral or back blow zone Z–4.

In another embodiment, the invention as shown in FIGS. 17 to 24 provides for a filtration cycle wherein the filtrate liquid from a cake forming zone and the spent liquid from a subsequent cake washing and drying zone may be collected in separate vacuum receivers.

Figure 17:
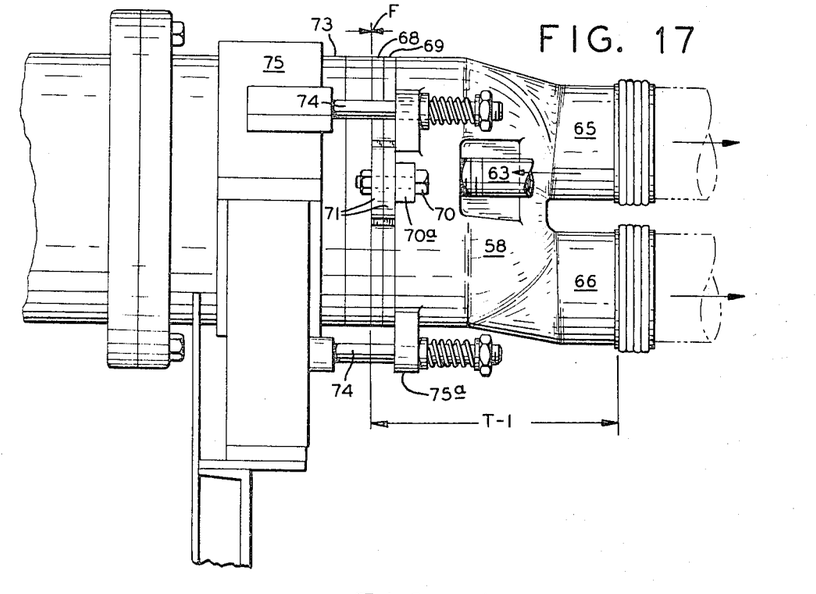
FIG. 17 is a side view of a modified valve construction, similar to FIG. 3, designed for the separation of strong and weak filtrate liquors with a modified valve plate assembly.
Figure 18:
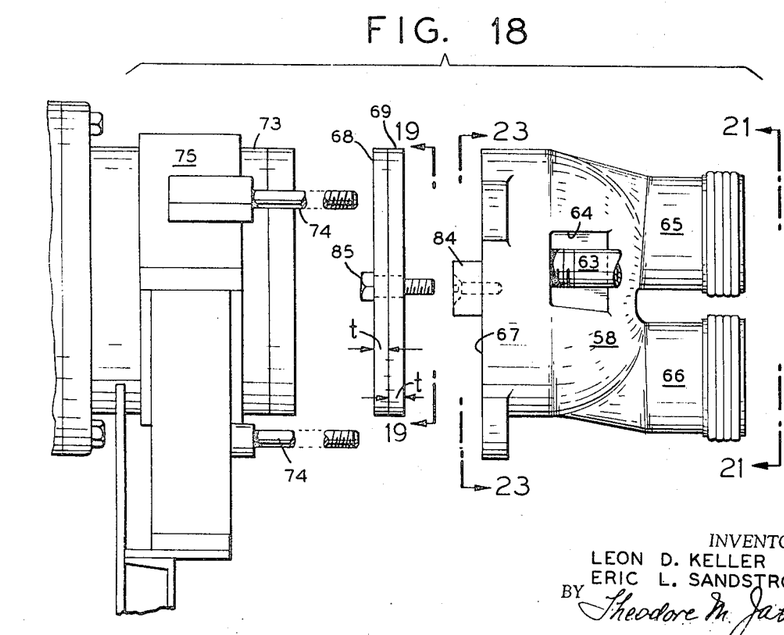
FIG. 18 is an exploded view of FIG. 17, showing the bridge plate assembly separated from the adjoining parts.

For that purpose, the trunnion valve T–1 shown in FIGS. 17 and 18 comprises a manifold member 58 having internal partition walls 59 defining not only (see FIG. 23) a throughtflow chamber 60 for back-blow air at one side, but also a lower throughflow chamber 61 for vacuum withdrawal of filtrate liquid, and an upper throughflow chamber 62 for vacuum withdrawal of spent wash liquor or the like. Accordingly, the manifold member is provided with a laterally located backflow air connection 63 accommodated in a recess 64, and with an upper vacuum supply neck 65 and lower vacuum supply neck 66.

Attached to the vertical end face 67 of the manifold member is a pair of bridge plates 68 and 69 each of the thickness *t*, substantially in the manner already described in the embodiment shown in FIGS. 1 to 16 above. The attachment is indicated in FIG. 17 as by horizontal fastening bolt 70 extending through a lug 70a of the manifold member and lugs or projections 71 formed on the bridge plates, and having arcuate slots 72 (see FIG. 19) similar to the previous embodiment.

The manifold member 58 assembled with bridge plates 68 and 69 in turn is held coaxial with the trunnion 73 of the filter shaft, by means of a set of horizontal fastening bolts 74 extending rigidly from a trunnion bearing structure 75 and through lugs 75a of manifold member 58, substantially in the manner previously described.

Figures 18A, 19, 19A:
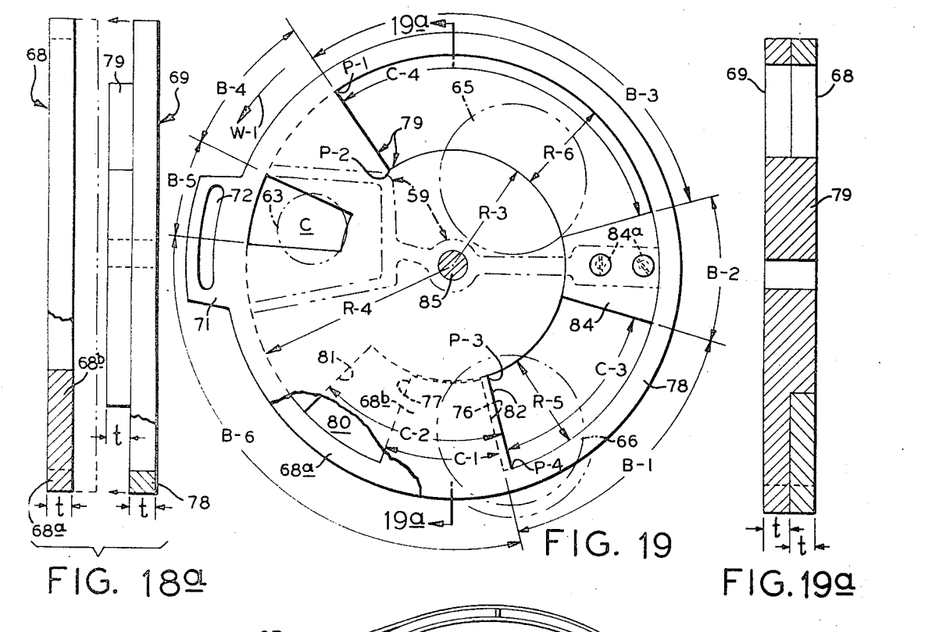
FIG. 18a is an enlarged view of the bridge plate assembly of FIG. 18, showing the two bridge plates drawn apart.
FIG. 19 is a cross-section taken on line 19—19 in FIG. 18, showing the outwardly facing side of the valve plate assembly.
FIG. 19a is a sectional view of the plate assembly, taken on line 19a—19a of FIG. 19.

The bridge plates 68 and 69 taken from FIG. 18 are drawn apart in FIG. 18a indicating the manner in which they will cooperatively inter-engage when assembled as shown in FIG. 19 to provide the required operating zones in the filtration cycle. With the shaft rotating in the direction of arrow W–1, this filtration cycle comprises a first vacuum or cake forming zone B–1, a first neutral or blank-off transition zone B–2, a second vacuum or cake washing and drying zone B–3, a second neutral or blank-off transition zone B–4, a blow-back zone B–5, and a third neutral or blank-off zone B–6.

The bridge plates 68 and 69 cooperate, and are adjustable relative to each other, substantially in the manner of the bridge plates in the first-described embodiment. The axially inwardly located bridge plate 68 in contact with the trunnion end face, may be identical to the one in the embodiment of FIGS. 1 to 16, comprising a ring member 68a and an inwardly extending bridge block 68b defined by arc C–1 and radial faces 76 and 77. The axially outwardly located bridge plate 69 comprises a ring member 78 having a bridge block 79 of a thickness twice the thickness *t* of the ring member, so that only the outwardly facing vertical side of the block is coplanar with that of the ring member 78, the axially inwardly projecting portion of thickness *t* of the block being surrounded by, and fitted into the companion ring member of bridge plate 69.

The outline of bridge block 79 comprises the radial line between points P–1 and P–2, the arcuate line of radius R–3 between points P–2 and P–3, the radial line between points P–3 and P–4, and the arcuate line of radius R–4 between points P–4 and P–1, R–4 being the inner radius of both ring members 68a and 78. The lower end of this bridge block is formed with an arcuate recess 80 defined by an arc C–2 and radial end faces 81 and 82, and accommodates the companion bridge block 68b, cooperating therewith in the manner previously described, with the bridge plates turnably adjustable relative to one another. Bridge block 79 within the plate assembly also forms a throughflow passage area C for blowback air.

A third bridge block 84 of double the thickness *t* provides the neutral zone B–2 which functionally separates the two vacuum zones B–1 and B–3 in the filtration cycle. This bridge block may be fastened to the partition wall of the manifold as indicated by screws 84a, with its inner arcuate face of radius R–3 in slideable contact with the bridge block 79 and its outer arcuate face of radius R–4 in slideable contact with the ring members incident to rotational adjustment of the plates relative to one another.

This bridge plate assembly provides a lower arcuate throughflow passage area defined by an arc C–3 and the radial dimension R–5, communicating with neck 66 (in dot-and-dash) for delivery of filtrate liquid, and an upper arcuate flow passage area defined by an arc C–4 and radial dimension R–6, communicating with neck 65 (in dot-and-dash) for delivery of spent wash liquid, to respective vacuum receivers. The back-blow connection 63 is here also indicated in dot-and-dash relative to the through-flow passage area C in the plate assembly.

In this plate assembly, the bridge plate 69 is centered relative to the filter axis by a central pivot bolt 85 threaded into or seated in the partition wall construction 59 of the manifold. The companion bridge plate 68 in turn is centered on the block 79 of bridge plate 69 as well as on the third bridge block 84.

Figures 25, 26, 27:
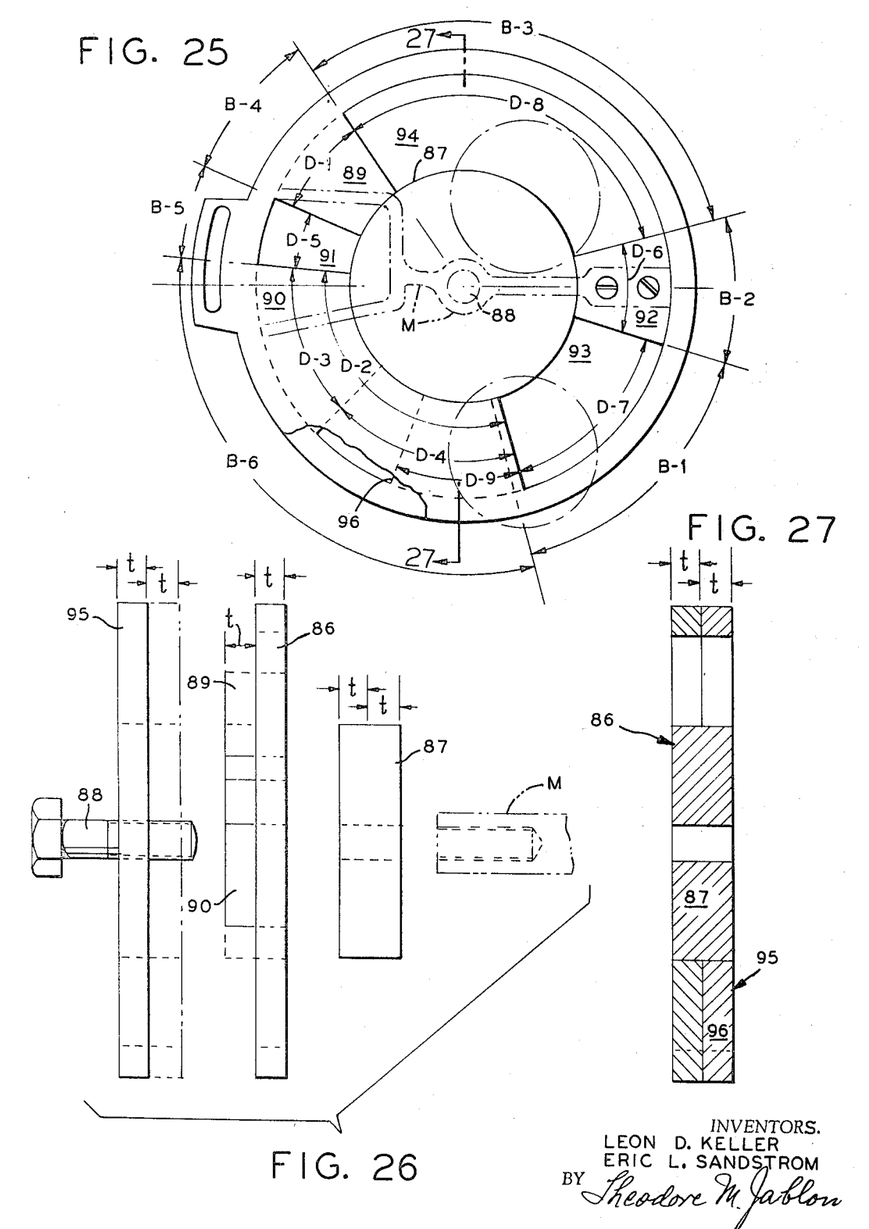
FIG. 25 shows the bridge plate assembly of FIG. 19 in a slightly different version, but with the identical filtration cycle and adjustability.
FIG. 26 is an exploded side view of the bridge plate assembly of FIG. 25.
FIG. 27 is a sectional view of the bridge plate assembly, taken on line 27—27 in FIG. 25.

FIGS. 25, 26, and 27 show a version of a bridge plate assembly somewhat different from the embodiment in FIG. 19, although providing the identical filtration cycle and adjustability of the operating zones. In this version, the axially outwardly located bridge plate 86 is centered about a disc 87 of double the thickness *t*, the disc itself being mounted concentric with the filter axis by means of a pivot bolt 88 held in partition wall construction M of the manifold member here indicated in dot-and-dash. Otherwise similar to FIG. 19 the bridge plate 86 comprises a ring member to which are fixed a first bridge block 89 of double the thickness *t* and defined by arc D–1 and a second bridge block 90 defined by arc D–2 and having an arcuate portion D–3 of double the thickness *t* and a complementary arcuate portion of single thickness *t* providing an arcuate recess D–4. The two bridge blocks 89 and 90 between them form the back-blow passage opening 91 defined by arc D–5. A third bridge block 92 defined by arc D–6 of double the thickness *t* is fixed to the partition wall construction M shown in dot-and-dash. Between bridge blocks 90 and 92 is an arcuate throughflow passage opening 93 defined by arc D–7 for filtrate liquid. Between bridge blocks 92 and 89 is an arcuate throughflow passage opening 94 defined by arc D–8.

The axially inwardly located companion bridge plate 95 is identical to the one in FIG. 19 comprising a ring member to which is fixed a bridge block 96 defined by arc D–9 engaging in recess D–4 of bridge plate 86, and shiftable therein when the two bridge plates in the assembly are rotatably adjusted relative to one another.

The operating zones of the filtration cycle in FIG. 25 are identical to, and are designated the same as in FIG. 19. In case the bridge block 92 is to be eliminated in order to consolidate the two vacuum zones into a single zone, the supplemental guide means or locating pins 56 from the embodiment in FIGS. 1 to 17 may be substituted.

Figure 20:
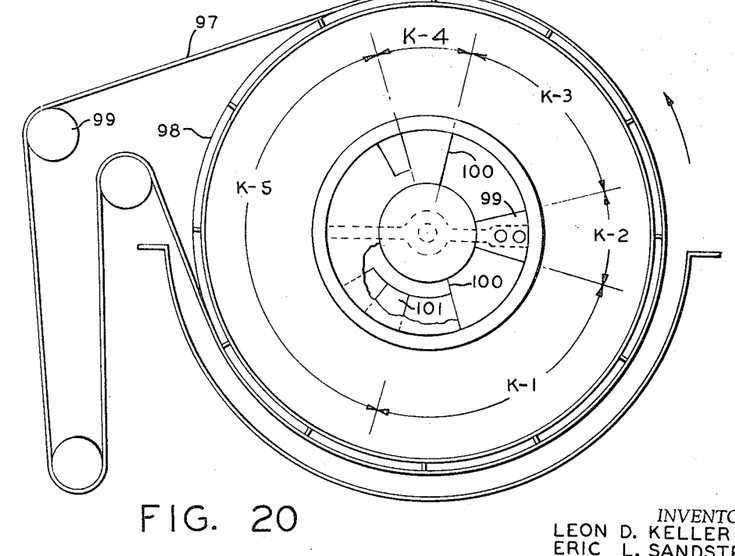
FIG. 20 is a diagrammatic view of a belt type drum filter, showing a filtration cycle employing the valve plate assembly of FIG. 19, without blow-back provision.
Figure 21:
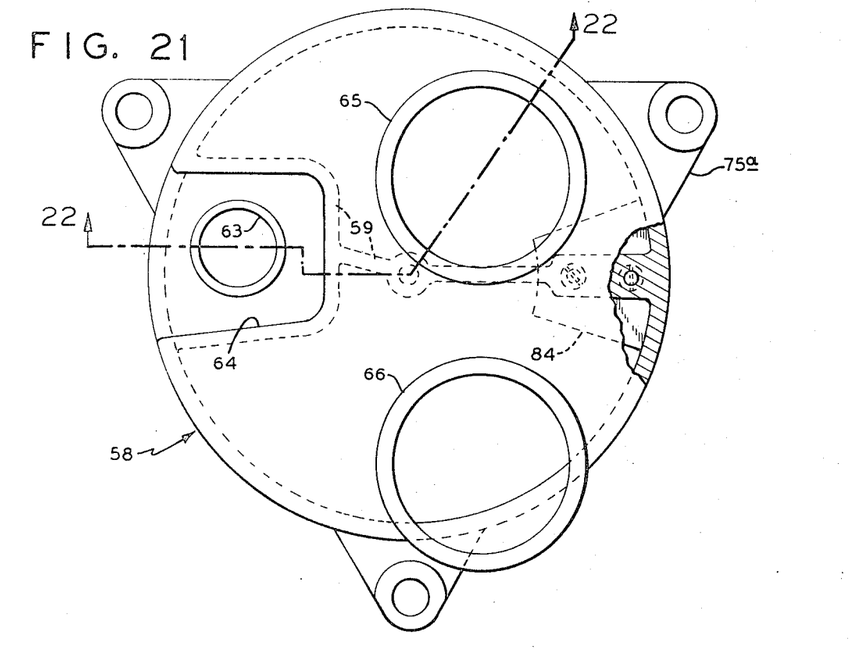
FIG. 21 is an end view of the manifold part of the valve construction, taken on line 21—21 in FIG. 18, showing separate filtrate liquor withdrawal connections.
Figure 22:
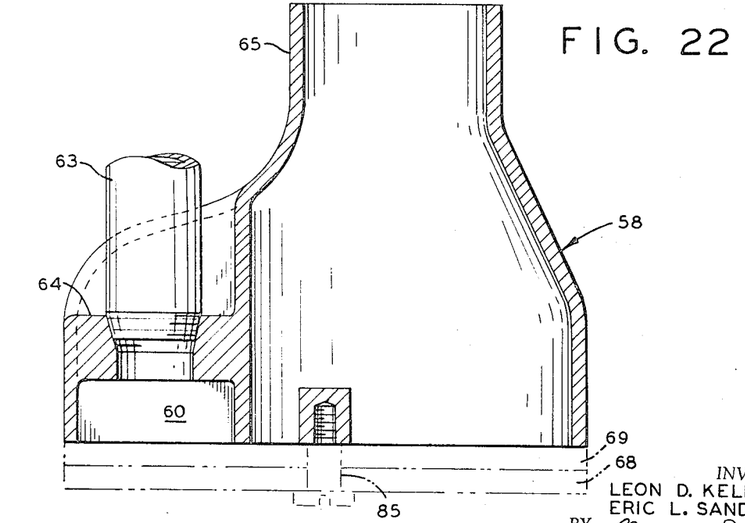
FIG. 22 is a sectional view of the manifold part, taken on line 22—22 in FIG. 21.
Figure 23:
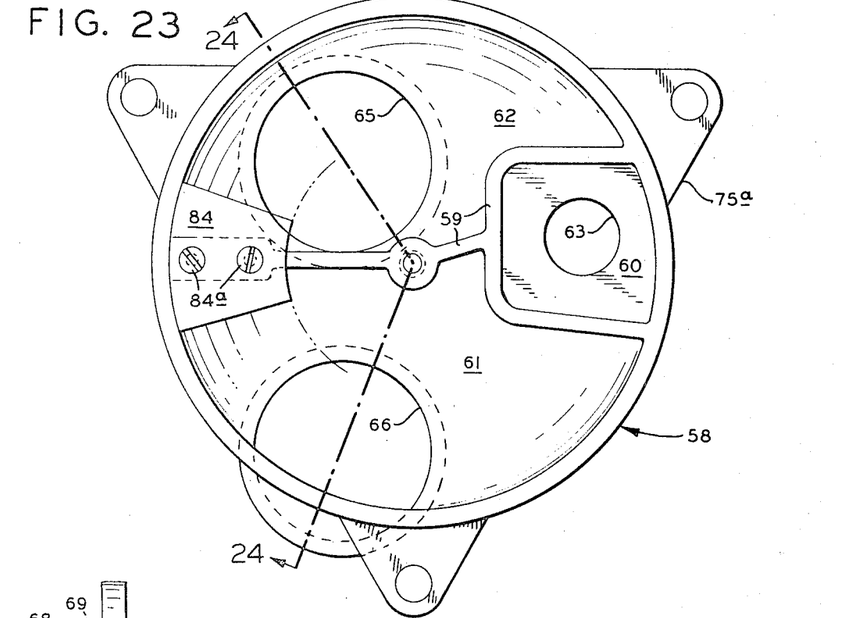
FIG. 23 is a cross-sectional view taken on line 23—23 in FIG. 18, showing the interior of the manifold part of the valve construction.
Figure 24:
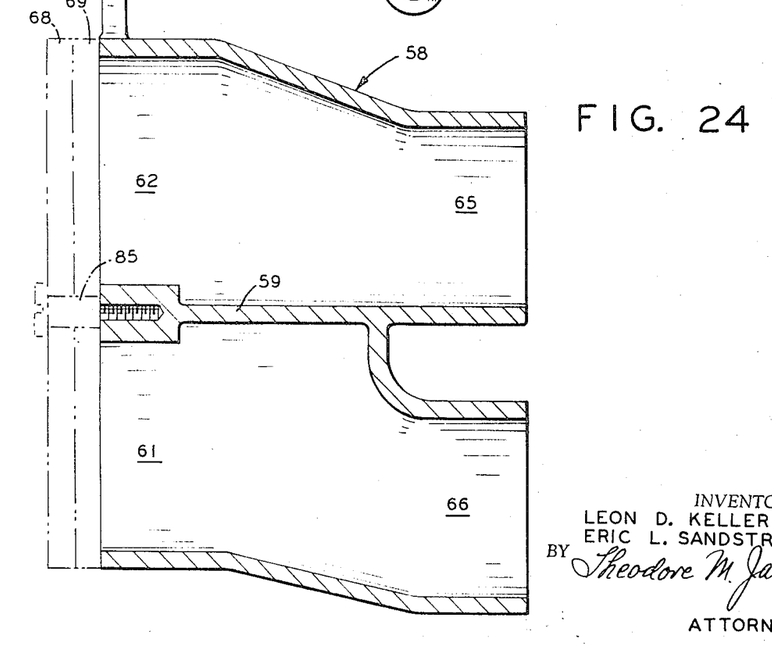
FIG. 24 is a sectional view of the manifold part, taken on line 24—24 in FIG. 23.

In FIG. 20 the improved trunnion valve of this invention is diagrammatically shown as applied to a belt type drum filter the operating principle of which is well known. Since the filter cake discharge is by way of the filter belt 97 leaving the drum 98 for delivery of filter cake over a discharge roller 99, no blow-back air is here applicable in the operation of the trunnion valve, although atmospheric pressure is admitted to the filter chambers through port 98a as the belt leaves the drum. Hence, the construction of the bridge plate assembly is such that the filtration cycle comprises a vacuum cake pick-up zone K–1, a neutral or blank-off transition zone K–2 provided by bridge block 99, a vacuum cake washing and drying zone K–3, a neutral transition zone K–4 and an extended neutral zone K–5 which has been vented through port 98a. Zone K–5 is provided by bridge block 100 of the one bridge plate cooperating with bridge block 101 of the companion bridge plate. Both bridge plates are rotationally adjustable about the filter axis relative to one another substantially in the manner previously described, or adjustable together relative to the stationary manifold member or vacuum supply.

As an example, a practical and important application of this invention is found where finely ground Taconite iron ore concentrate is to be subjected to filtration, for instance on a disc filter of the type herein illustrated. In that operation the provision of independent adjustment of the point of initial vacuum cake pick-up is for the purpose of controlling the thickness and moisture content of the cake, since finely ground Taconite concentrate will form a very impermeable filter cake very rapidly.

Under these conditions, if the cake thickness were allowed to build up beyond ⅜″, because of the above mentioned characteristics, the moisture of the pulp would increase very rapidly, making it impossible to prepare the filter cake material for pelletizing in the so-called "balling step," that is the formation of the cake material into ball-shaped pellets which must subsequently be dried and hardened in gas-fired furnaces at white heat to furnish the pelletized iron ore charge for the blast furnaces.

As a corrective measure, one could increase the filter speed and thus reduce the time available for vacuum cake pick-up to obtain a thinner filter cake. However, such increased speed would also reduce the time allowed for sector drainage and cake drying, and eventually tend to increase the cake moisture rather than decrease it.

Other manipulation techniques for obtaining a drier filter cake are by way of increasing the temperature of the feed pulp supplied to the filter, reducing the dilution of the pulp, and increasing the filter vacuum differential, all of which measures might be used individuallly or in various combinations.

Yet, by comparison, the most effective, practical, time-saving and precise adjustment for optimum cake thickness and dryness, achieved by this invention, is to reduce the filter speed while also reducing the extent of the vacuum cake pick-up zone independently of the cake discharge zone, thereby maintaining the cake thickness within the prescribed limit, while obtaining longer sector drainage and cake drying time in the filtration cycle prior to cake discharge.

We claim:

1. In a continuous filter having an assembly of filter chambers rotating about a horizontal axis on a pulp containing vat, and operating in a filtration cycle having a vacuum cake forming zone effective during submergence of said chambers in the pulp, a vacuum cake drying zone subsequent to the cake forming zone after emergence of said chambers from the pulp, a back blow zone for effecting cake discharge located at the descending side of the rotating assembly, a first neutral zone between said drying zone and said back blow zone, and a second neutral zone between said back blow zone and said vacuum cake forming zone; the provision of a valve construction for controlling said filtration cycle, which comprises a trunnion at the end of said rotatable assembly, having internal horizontal ducts equally spaced about the horizontal axis, and leading from the end face of the trunnion to the respective filter chambers;

a stationary hollow valve member located directly opposite said trunnion and having an inner end face parallel and opposite to the end face of said trunnion, said valve member being partitioned so as to provide a major throughflow area for vacuum supply to said ducts, and a minor throughflow area for back blow supply to said ducts;

an assembly of a pair of bridge plates for controlling the filtration cycle, interposed between said trunnion and said stationary valve member in contact therewith and in contact face-to-face with one another, said bridge plates being mounted so as to be individually turnably adjustable about said axis, and being constructed and arranged relative to each other for adjusting respective zones of the filtration cycle independently of one another by the turntable adjustment of said plates;

first fastening means operable to retain said bridge plate assembly in adjusted position relative to said stationary valve member so as to constitute therewith a sub-assembly, and second fastening means operable to maintain said sub-assembly cooperative with said trunnion in the operation of the filtration cycle incident to rotation of said trunnion.

2. The valve construction according to claim 1, wherein the first of said pair of bridge plates is in contact with the inner face of said stationary valve member, and comprises a first ring member having vertical inner and outer side faces and an inner cylindrical face concentric with said axis, and a first bridge block having an outer arcuate surface conforming and fixed to said cylindrical face of the ring member, and extending through an arc substantially corresponding to the descending side of said rotating assembly, and having an outer vertical end face co-planar with said outer vertical face of the ring member, said first bridge block being formed with an upper raised initial portion defined by a vertical face parallel to, and spaced from, the inner vertical side face of said ring member and providing blank-off area for said ducts, and with a lower depressed terminal portion defined by a vertical face co-planar with the inner side face of said ring member and extending from said raised portion to a free terminal edge, and by a concave arcuate face parallel to and concentric with said outer arcuate face of the bridge block, and extending from said raised portion along the inner edge of said co-planar face to a free terminal edge, said upper raised portion of the bridge block further being formed with a back blow passage communicating with said minor throughflow area of the stationary valve member;

and wherein the second of said pair of bridge plates comprises a second ring member similar to, and concentric with said first ring member, and conforming to the exposed portion of said outer arcuate surface of said first bridge block, said second ring member having a second bridge block extending radially inwardly therefrom, fitted into said recessed portion of the first bridge block, providing additional blank-off area for said ducts, so that turning said second ring member about said axis will independently vary the cake forming zone, whereas turning the first ring member about said axis will independently vary the blow back and cake discharge zone.

3. The valve construction according to claim 2, wherein said first ring member is provided with guide means opposite and complementary to said outer arcuate surface of the first bridge block, for centering both ring members relative to one another.

4. The valve construction according to claim 2, wherein said first bridge block has an inner concave arcuate surface parallel to and concentric with said outer arcuate surface, and wherein said depressed portion of the block is of L-shaped cross-sectional configuration.

5. The valve construction according to claim 2, wherein said upper portion of the bridge block is formed with a radial recess in the outer arcuate face thereof, shaped to provide said back blow passage for the cake discharge.

6. The valve construction according to claim 5, wherein said recess is of sector-shaped configuration.

7. The valve construction according to claim 2, wherein said stationary valve member has additional partition means constructed and arranged so as to divide said vacuum supply area to provide at least two sequential independently operable vacuum supply zones, wherein said first bridge block comprises a shaped portion surrounding said axis, shaped so as to provide a secondary convexly arcuate surface concentric with and parallel to said axis and substantially opposite to said outer arcuate surface, and of a radius substantially smaller than that of said outer surface, and having vertical faces co-planar with those of said block, with the addition of a third bridge block connected to said additional partition means in the stationary valve member, and shaped and arranged so as to cooperate with said secondary arcuate surface, as well as with the adjoining inner cylindrical faces of said ring members to provide a third neutral zone between said sequential vacuum supply zones.

8. The valve construction according to claim 7, wherein means are provided for centering said first bridge block together with the first ring member relative to said axis, which comprises a pin extending rigidly from said partition means axially through said shaped portion of the block.

9. In a continuous filter having an assembly of filter chambers rotating about a horizontal axis on a pulp containing vat, and operating in a filtration cycle having a vacuum cake forming zone effective during submergence of said chambers in the pulp, a vacuum cake drying zone subsequent to the cake forming zone after emergence of said chambers from the pulp, and a neutral zone following said drying zone, allowing filter cake to be discharged, the provision of a valve construction for controlling said filtration cycle, which comprises a trunnion at the end of said assembly of filter chambers, having internal horizontal ducts equally spaced about the horizontal axis, and leading from the end face of the trunnion to the respective filter chambers;

a stationary hollow valve member located directly opposite said trunnion and having an inner end face parallel and opposite to the end face of said trunnion, concentric therewith, said valve member providing a throughflow area for vacuum supply to said ducts, an assembly of a pair of bridge plates for controlling the filtration cycle, interposed between said trunnion and said valve member in contact therewith, and in contact face-to-face with one another, said bridge plates being mounted so as to be individually turnably adjustable about said axis, and being constructed and arranged relative to each other for adjusting respective zones of the filtration cycle independently of one another by the turnable adjustment of said plates;

first fastening means operable to retain said bridge plate assembly in adjusted position relative to said stationary valve member so as to constitute therewith a sub-assembly;

and second fastening means operable to maintain said sub-assembly cooperative with said trunnion in the operation of the filtration cycle incident to the rotation of said trunnion.

10. The valve construction according to claim 9, wherein the first of said pair of bridge plates is in contact with the inner end face of said stationary valve member, and comprises a first ring member having vertical inner and outer side faces and an inner cylindrical face concentric with said axis, and a first bridge block having an outer arcuate surface conforming and fixed to said inner cylindrical face of the ring member, and extending through an arc substantially corresponding to the descending side of said drum, and having outer vertical end face co-planar with said outer vertical face of the ring member, said first bridge block being formed with an upper raised initial portion defined by a vertical face parallel to and spaced from the inner vertical side face of said ring member and providing blank-off area for said ducts, and with a lower depressed terminal portion defined by a vertical face co-planar with the inner side face of said ring member and extending from said raised portion to a free terminal edge, and by a concave arcuate face parallel to and concentric with said outer arcuate surface of the bridge block, and extending from said raised portion along the inner edge of said vertical co-planar face to a free terminal edge; and wherein the second of said pair of bridge plates is in contact with the end face of said trunnion, and comprises a second ring member similar to, and concentric with said first ring member, and conforming to the outer arcuate surface of said raised bridge block portion, and having an inner vertical side face co-planar with the vertical face of said raised portion, said second ring member having a second bridge block extending radially inwardly therefrom, and having vertical faces co-planar with respective vertical side faces of said second ring member, said second bridge block being fitted into said recessed portion of the first bridge block, providing additional blank-off area for said ducts, in such a manner that turning said second ring member about said axis will independently vary the extent of the cake forming zone, whereas turning the first ring member about said axis will independently move the block back and cake discharge zone.

11. The valve construction according to claim 10, wherein said first ring member is provided with guide means opposite and complementary to said outer arcuate surface of the first bridge block, for centering both ring members relative to one another.

12. The valve construction according to claim 10, wherein said first bridge block has an inner concave arcuate surface parallel to and concentric with said outer arcuate surface, and wherein said depressed portion of the block is of L-shaped cross-sectional configuration.

13. The valve construction according to claim 10, wherein said stationary valve member has partition means constructed and arranged so as to divide said vacuum supply area to provide at least two sequential independently operable vacuum supply zones, wherein said first bridge block comprises a shaped portion surrounding said axis, shaped so as to provide a secondary convexly arcuate surface concentric with and parallel to said axis and substantially opposite to said outer arcuate surface, and of a radius substantially smaller than that of said outer surface, and having vertical faces co-planar with those of said block, with the addition of a third bridge block connected to said partition means in the stationary valve member, and shaped and arranged so as to cooperate with said secondary arcuate surface, as well as with the adjoining inner cylindrical faces of said ring members to provide a third neutral zone between said sequential vacuum supply zones.

14. The valve construction according to claim 13, wherein means are provided for centering said first bridge block and first ring member relative to said axis, which comprise a pin extending rigidly from said partition means axially through said shaped portion of the block.

15. A filter having a continuously travelling filter surface at a portion of which a vacuum flow is applied for cake pick-up, and at a portion of which vacuum is cut off for cake discharge, means providing a passageway through which vacuum flow communicates with the filter surface, a bridge plate means hving a flow passage opening and a flow blocking portion extending across said passageway in position to open or close said passageway on registry of the opening or blocking portion respectively with the passageway, means for imparting relative rotary motion between said bridge plate means and the passageway successively to register said opening and blocking portion with the passageway in timed relation to the movement of the filter surface, said bridge plate means comprising a first blocking part determining the position at which vacuum is cut off from said travelling surface, and a second blocking part determining the position at which said vacuum commences, one of said blocking parts being adjustable with respect to the other about the axis of said rotary motion.

16. The filter according to claim 15, with the addition of means for rotationally adjusting said bridge plate means about said axis.

17. The filter according to claim 15, wherein said bridge plate means has axially projecting annular guide surfaces engaging and guiding one of said blocking parts to maintain it in axial alignment during its adjustment with respect to the other of said blocking parts.

18. The filter according to claim 15, wherein said bridge plate means comprises a pair of plates one of which carries the first blocking part and the other of which carries the second blocking part, and axially extending inter-engaging arcuate portions on said discs arranged to maintain the plates in axial alignment while permitting relative annular adjustment of one plate with respect to the other to vary the annular relationship between said blocking parts.

19. The filter according to claim 15, in which said passageway means also has a passageway for communicating blow to said filter surface, and said bridge plate means has a blow passage opening positioned to register with said blow passage in timed relation to the movement of said filter surface to aid in discharging the cake therefrom.

References Cited
UNITED STATES PATENTS

| | | | |
|---|---|---|---|
| 2,289,762 | 7/1942 | Duvall | 210—404 X |
| 2,899,068 | 8/1959 | King et al. | 210—404 X |
| 3,027,011 | 3/1962 | Flynn | 210—404 |
| 3,193,105 | 7/1965 | Putnam | 210—331 |
| 3,220,554 | 11/1965 | Burchert et al. | 210—404 X |
| 3,409,134 | 11/1968 | Wallace et al. | |

REUBEN FRIEDMAN, *Primary Examiner.*

FRANK A. SPEAR, JR., *Assistant Examiner.*

U.S. Cl. X.R.

210—333, 401, 404